United States Patent [19]

Lawson

[11] Patent Number: 5,422,758
[45] Date of Patent: Jun. 6, 1995

[54] ADJUSTABLE BEAM SPLITTER

[75] Inventor: William E. Lawson, Somerset, Wis.

[73] Assignee: Laser Machining, Inc., Somerset, Wis.

[21] Appl. No.: 118,037

[22] Filed: Sep. 8, 1993

[51] Int. Cl.⁶ .................. G02B 27/10; G02B 7/18; H01S 3/10

[52] U.S. Cl. .................. 359/634; 359/629; 359/633; 359/849; 359/850; 372/9

[58] Field of Search ............... 359/629, 633, 634, 627, 359/636, 638, 843, 849, 850, 854, 855; 385/47; 372/15, 14, 99, 20, 9

[56] References Cited

U.S. PATENT DOCUMENTS

| | | | |
|---|---|---|---|
| 3,668,406 | 6/1972 | Reid et al. | 359/629 X |
| 3,879,109 | 4/1975 | Thomas | 359/629 X |
| 4,411,492 | 10/1983 | Bluege | 359/627 X |
| 4,660,932 | 4/1987 | Eckbreth | 359/629 X |
| 5,319,668 | 6/1994 | Luecke | 372/15 |

FOREIGN PATENT DOCUMENTS 54-72065 6/1979 Japan .................. 359/634 X

OTHER PUBLICATIONS

Franzen, "Precision Beam Spitters for CO₂ Lasers" Applied Optics vol. 14, No. 3 3/75 pp. 647–652.
Advertisement for "Programmable Attentuator for High Power Lasers" from MPB Technologies Inc., Quebec Canada, published previous to Sep. 8, 1993.
Advertisement for "Polarizers & Wave Plates" from II–VI Corporation, Saxonburg, Pa., published previous to Sep. 8, 1993.
"Basic Beamsplitter Optics" report from II–VI Corporation, Saxonburg, Pa., published previous to Sep. 8, 1993.

*Primary Examiner*—Brian Healy
*Attorney, Agent, or Firm*—Kinney & Lange

[57] ABSTRACT

An adjustable beam splitter includes a pentaprism type reflector unit including a housing, a splitter mirror positioned in the housing for transmitting a portion of an input energy beam and for reflecting a portion of the input energy beam, and a reflective mirror mounted within the housing for directing the reflected portion of the input energy beam at a fixed angle to the input energy beam regardless of the angle of incidence of the input energy beam to the splitter mirror and regardless of manufacturing tolerances of the splitter mirror. Translation of the reflected portion of the input energy beam is reduced and the split ratio adjusted by rotating the pentaprism type unit about a line corresponding to the intersection of a plane containing the splitter mirror and a plane containing the reflective mirror.

22 Claims, 2 Drawing Sheets

ADJUSTABLE BEAM SPLITTER

BACKGROUND OF THE INVENTION

The present invention relates to a beam splitter for transmitting a portion of an input energy beam and for reflecting a portion of the input energy beam, and more particularly, to an adjustable beam splitter for varying a split ratio defined by the ratio of the energy in the transmitted portion of the input energy beam to the energy in the reflected portion of the input energy beam.

A conventional beam splitter mirror generally consists of a partially silvered mirror positioned in the path of an input energy beam. A portion of the input energy beam is transmitted through the splitter mirror while a portion of the input energy beam is reflected from the splitter mirror at an angle of reflection equal to the angle of incidence of the input beam with respect to the splitter mirror. The split ratio is controlled by the coatings used on the splitter mirror. Since it is undesirable to replace the splitter mirror every time the split ratio is changed, the splitter mirror is fixedly mounted at a fixed angle to the input energy beam and a Brewster window type device is placed in the path of the transmitted portion of the input energy beam and/or in the path of the reflected portion of the input energy beam and rotated so as to trim away energy of the respective incoming beam. Thus, Brewster window type devices require the user to make individual downstream optical corrections for each split ratio adjustment.

It is also necessary to adjust the split ratio of the input energy beam since splitter mirrors typically provide a split ratio with a ±5% error and even the lightest quality splitters have an error of ±1% which deteriorates with age. These manufacturing tolerances of splitter mirrors cause variances in the split ratio which require trimming in order to maintain the desired split ratio.

Another problem with conventional beam splitters is that if the beam splitter is bumped or becomes misplaced with respect to the input energy beam, the reflected portion of the input energy beam will again be reflected off-center of any downstream optics resulting in errors and system failures.

SUMMARY OF THE INVENTION

The present invention overcomes the problems of prior correction techniques by providing an adjustable beam splitter which directs the reflected portion of the input energy beam at a fixed angle to the input energy beam regardless of the angle of incidence of the input energy beam, regardless of the split ratio and regardless of the manufacturing tolerances of the splitter mirror. In the illustrated embodiment, the adjustable beam splitter includes a pentaprism type reflector unit including a housing, a splitter mirror positioned in the housing for transmitting a portion of the input energy beam and for reflecting a portion of the input energy beam, and a reflective mirror mounted within the housing for directing the reflected portion of the input energy beam perpendicular to the input energy beam. Translation of the reflected portion of the input energy beam is prevented and the split ratio adjusted, by rotating the pentaprism unit (thereby changing the angle of incidence of the input energy beam on the splitter mirror) about a line corresponding to the intersection of a plane containing the splitter mirror and a plane containing the reflective mirror.

DETAILED DESCRIPTION OF THE PREFERRED EMBODIMENTS

Figure 1:
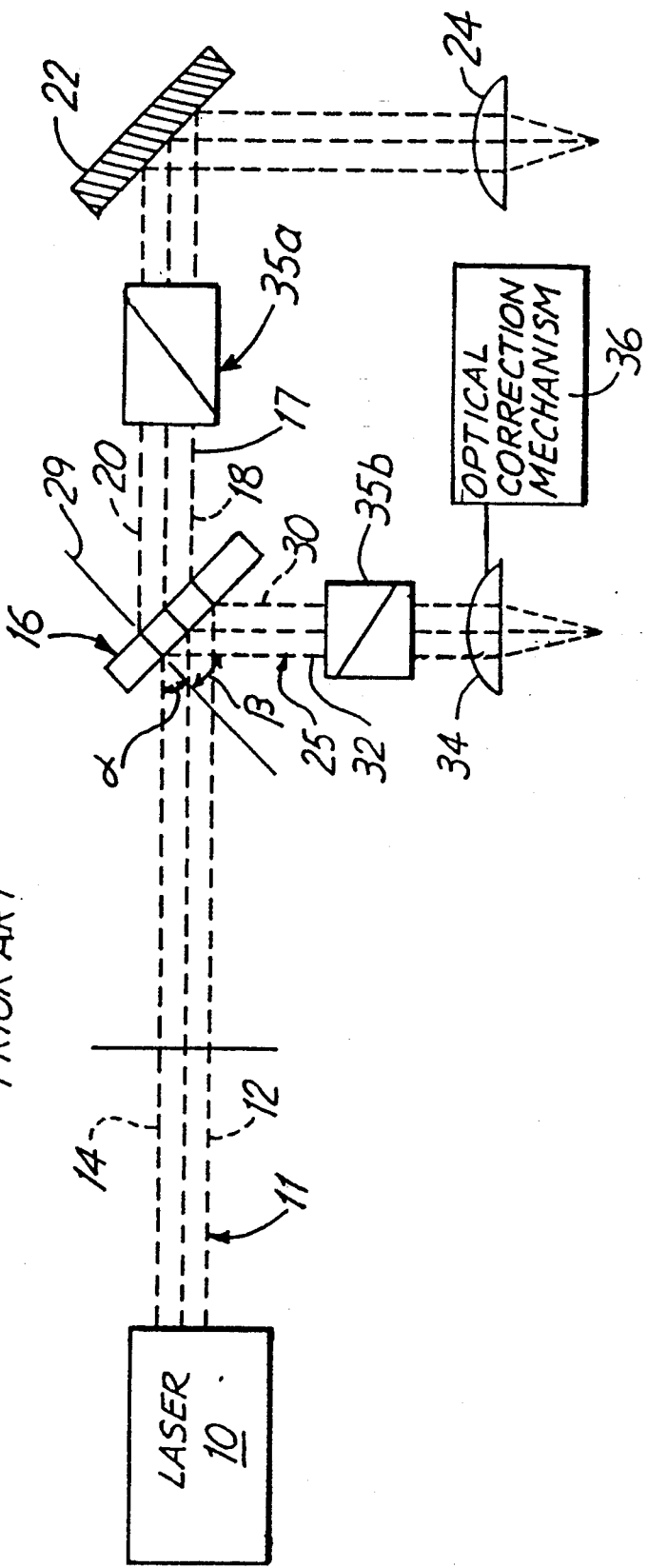
FIG. 1 is a drawing illustrating a beam splitting system available in the prior art.

There are many laser applications which require splitting an input energy beam into multiple lower powered beams, such applications include drilling, cutting, scoring or welding. FIG. 1 illustrates the conventional apparatus for splitting an incoming beam of energy.

In FIG. 1 (prior art), a laser 10 projects an input energy beam 11 along a path shown by dashed lines 12 and 14 to a partially silvered mirror or beam splitter 16. The beam splitter 16 passes a portion of the input energy beam 11 (transmitted output beam 17) along a path shown by dashed lines 18 and 20 to a set of first downstream optics which may include a mirror 22 and a lens 24. The beam splitter 16 also reflects a portion of the input energy beam 11 (reflected output beam 25), along a path shown by dashed lines 30 and 32 to a second set of downstream optics which may include a lens 34. The reflected output beam 25 is reflected at a reflection angle $\beta$ equal to the incidence angle $\alpha$ of the input energy beam 11 with respect to a perpendicular line 29 to the beam splitter 16. In FIG. 1, the angle of incidence $\alpha$ is 45° so that the reflected output beam 25 is perpendicular to the input energy beam 11.

The power in the reflected output beam 25 with respect to the power in transmitted output beam 17 is the split ratio. The split ratio is varied by varying the position of a Brewster window or a thin film polarizer device 35a and 35b positioned in the path of the transmitted output beam 17 and/or in the path of the reflected output beam 25 and is also a function of the coating on the partially silvered mirror 16. The coating is selected such that a 45° angle of incidence produces a split ratio of 0.50±1%. However, due to manufacturing tolerances of the partially silvered mirror 16, the transmitted output beam 17 and the reflected output beam may not be at a 0.50 split ratio even with a 45° angle of incidence and so must be trimmed using the Brewster window device 35a and 35b, respectfully to achieve the desired 0.50 split ratio. It is a well-known principle in optics that the split ratio is very sensitive to the angle of incidence of the input energy beam 11. Thus, if the angle of incidence $\alpha$ is not at 45°, such as if the splitter mirror is bumped or becomes misplaced, then the reflected output beam 25 is not perpendicular to the input energy beam 11 and downstream optical correction of lens 34 is required by use of an optical correction mechanism 36 to assure proper synchronization of the reflected output beam 25 with the lens 34.

Figure 2:
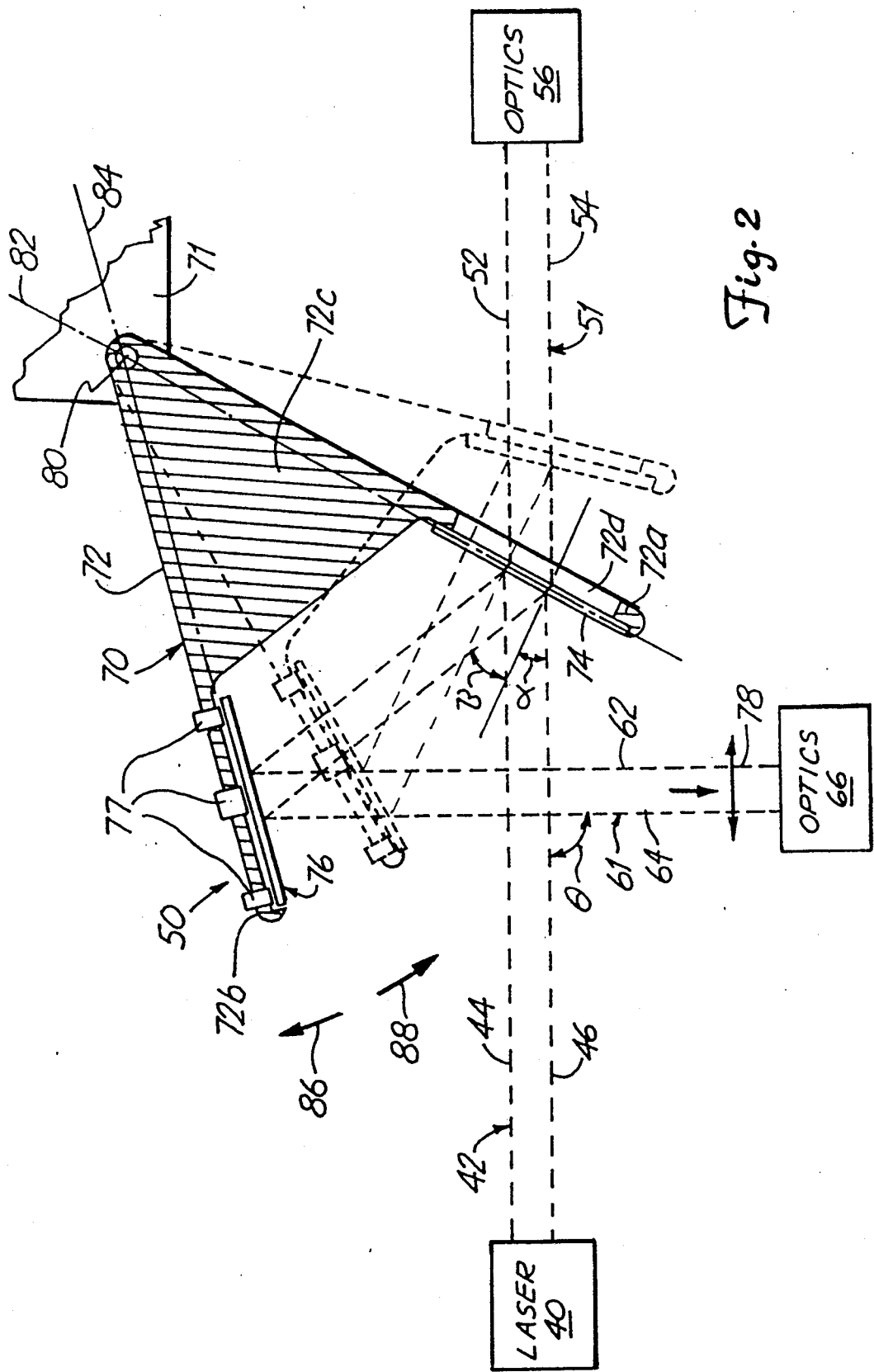
FIG. 2 is an elevational view of an adjustable beam splitter according to the present invention.

In FIG. 2, a laser 40 projects an input energy beam 42 along a path shown by dashed lines 44 and 46 to an adjustable beam splitter 50 according to the present invention. The adjustable beam splitter 50 transmits a portion of the input energy beam 42 (transmitted output beam 51) along a path shown by lines 52 and 54 to a first set of downstream optics 56, and reflects a portion of the input energy beam 42 (reflected output beam 61) along a path shown by lines 62 and 64 to a second set of downstream optics 66. The adjustable beam splitter 50 maintains the reflected output beam 61 at a fixed angle, $\theta$, (preferably 90°) to the input energy beam 42 regardless of the angle of incidence $\alpha$ of the input energy beam, regardless of the split ratio, regardless of manufacturing tolerances in the optics of the beam splitter 50, and regardless of the wavelength of the input energy beam 42.

The adjustable beam splitter 50 includes a pentaprism type reflector unit 70 fixed to a frame 71. The pentaprism type unit 70 includes a housing 72, a splitter mirror 74 positioned in the path of the input energy beam 42, and a 100% reflective mirror 76 positioned at a 45° angle to the splitter mirror 74 for directing the reflected energy beam 61 perpendicular to the input energy beam 42 regardless of the split ratio. The angle $\theta$ between the splitter mirror 74 and the reflective mirror 76 is variable by ±1° by using three spring loaded screws 77 positioned at right angles to each other, as in a conventional 90° corner block, to permit compensation for manufacturing errors in the reflective mirror 76 which would prevent a 90° angle between the input energy beam 42 and the reflected output beam 61 while still permitting adjustment of the split ratio. The pentaprism type reflector unit 70 is structurally similar to well know pentaprisms which include a pair of 100% reflective mirrors and which are fixed to a frame for redirecting an input beam 90° regardless of the angle of incidence of an input beam with either of the reflective mirrors. With the pentaprism type reflector unit 70 of the present invention, one of the 100% reflective mirrors is replaced with the partially silvered or splitter mirror 74 which is positioned in the path of the input energy beam 42.

The housing 72 of the adjustable beam splitter 50 is constructed of aluminum. The housing 72 includes a first arm 72a for mounting the splitter mirror 74, a second arm 72b for mounting the reflective mirror 76, a body portion 72c for pivotly mounting the housing 72 about an axis 80 corresponding to the intersection of a plane 82 containing the splitter mirror 74 and a plane 84 containing the reflective mirror 76. Since the splitter mirror 74 and the reflective mirror 76 are mounted together within the housing 72, the reflective mirror 76 moves in synchronization with the splitter mirror 74 to maintain the reflected energy beam 61 perpendicular to the input energy beam 42. The first arm 72a of the housing 72 has an opening 72d permitting the transmitted output beam 51 to pass therethrough.

The split ratio between the reflected output beam 61 and the transmitted output beam 51 is a function of the coating on the splitter mirror 74. In the present invention, the coating is selected such that the split ratio is 0.50 when the angle of incidence $\alpha$ of the input energy beam 42 to the splitter mirror 74 is 22.5°. In order to tune the system to achieve the desired split ratio, the housing 72 is pivoted about axis 80 in the direction of either arrow 86 or arrow 88 which causes the angle of incidence $\alpha$ of the input energy beam 42 to change with respect to the splitter mirror 74. However, rotation of the housing 72 about axis 80 corresponding to the intersection of the plane 82 containing the splitter mirror 74 and the plane 84 containing the reflective mirror 76 prevents undesired translation of the reflected output beam 61 in the direction of arrow 78 which would require additional downstream optical correction. In other words, if the pentaprism type unit 70 is adjusted, the reflected output beam 61 remains perpendicular to the input energy beam 42 and in line with downstream optics 66 so that downstream optical correction of downstream optics 66 is avoided and so that the system is tuned by adjusting only the pentaprism type unit 70.

In most applications it is desirable to use a split ratio of 0.5 and because of the manufacturing tolerance and wear characteristics of even the best splitter mirrors, the angle of incidence $\alpha$ has to be adjusted ±5° away from the desired 22.5° to maintain the desired 0.50 split ratio. Thus, the angle of incidence $\alpha$ of the present invention generally varies between 17.5° and 27.5°, although it is possible with the present invention to vary the angle of incidence $\alpha$ between 0° and 45°. The adjustable beam splitter 50 also prevents errors if the pentaprism type unit 70 is bumped or shaken since the reflected output beam 61 will also be maintained at a 90° angle to the input energy beam 42 and rotated about the axis 80 which prevents translation of the output energy beam 61.

The construction of the housing 72 may be varied, provided that the splitter mirror 74 and the reflective mirror 76 are maintained at a 45° angle to each other and provided that the splitter mirror 74 and reflective mirror 76 are pivoted about the axis 80 corresponding the intersection of planes 82 and 84 in order to adjust the split ratio.

Although the present invention has been described with reference to preferred embodiments, workers skilled in the art will recognize that changes may be made in form and detail without departing from the spirit and scope of the invention.

What is claimed is:

1. An adjustable beam splitter for splitting an input energy beam into a first output energy beam and a second output energy beam, the beam splitter comprising:
    a splitter mirror positioned in an input path of the input energy beam for transmitting the first output energy beam through the splitter mirror along a first output path and for reflecting the second output energy beam along a second output path, the strength of the first and second beams being dependent on the angle of incidence of the input beam to the splitter mirror; and
    a reflective mirror positioned in the second output path, wherein movement of the reflective mirror is synchronized with movement of the splitter mirror for reflecting the second output energy beam at a fixed angle to the input energy beam regardless of the angle of incidence of the input energy beam to the splitter mirror.

2. The adjustable beam splitter of claim 1, wherein the fixed angle is 90°.

3. The adjustable beam splitter of claim 1, wherein the splitter mirror and the reflective mirror are mounted together in a housing so that movement of the splitter mirror is synchronized with movement of the reflective mirror.

4. The adjustable beam splitter of claim 3, wherein the angle of incidence of the input beam is adjusted by moving the splitter mirror and the reflective mirror in an arcuate path.

5. The adjustable beam splitter of claim 4, wherein the splitter mirror and the reflective mirror are rotated about a line corresponding to the intersection of a plane containing the splitter mirror and a plane containing the reflective mirror.

6. The adjustable beam splitter of claim 5, wherein the plane containing the splitter mirror and the plane containing the reflective mirror are positioned at a 45° angle to each other.

7. The adjustable beam splitter of claim 1, wherein the angle of incidence of the input energy beam is between 0° and 45°.

8. The adjustable beam splitter of claim 1, wherein the input energy beam is an infrared laser beam.

9. The adjustable beam splitter of claim 1, wherein the input energy beam is an ultraviolet energy beam.

10. The adjustable beam splitter of claim 1, wherein the input energy beam is a laser beam produced by a $CO_2$ laser.

11. The adjustable beam splitter of claim 3, wherein the reflective mirror is adjustable within the housing independent of the splitter mirror.

12. The adjustable beam splitter of claim 11, wherein the reflective mirror positioned at a 45° angle to the splitter mirror and wherein the reflective mirror is adjustable independent of the splitter mirror over a range of ±1°.

13. An adjustable beam splitter comprising:
 a splitter mirror position in a path of an input energy beam for transmitting a potion of the input energy beam and for reflecting a portion of the input energy beam, the adjustable beam splitter having a split ratio defined by the ratio of the transmitted portion of the input energy beam to the reflected portion of the input energy beam;
 a reflective mirror operable with the splitter mirror for directing the reflected portion of the input energy beam at a fixed angle to the input energy beam regardless of the split ratio; and
 wherein movement of the splitter mirror and the reflective mirror is synchronized with each other.

14. The adjustable beam spitter of claim 13, wherein the fixed angle is 90°.

15. The adjustable beam splitter of claim 13, wherein the split ratio is adjusted by rotating the splitter mirror and the reflective mirror about a line corresponding to the intersection of a plane containing the splitter mirror and a plane containing the reflective mirror.

16. The adjustable beam splitter of claim 15, wherein the plane containing the splitter mirror and the plane containing the reflective mirror are positioned at a 45° angle to each other.

17. The adjustable beam splitter of claim 13, wherein the splitter mirror and the reflective mirror are mounted together in a housing so that movement of the splitter mirror is synchronized with movement of the reflective mirror.

18. The adjustable beam splitter of claim 17, wherein an angle of incidence of the input energy beam to the splitter mirror is between 0° and 45°.

19. The adjustable beam splitter of claim 17, wherein the reflective mirror is adjustable within the housing independent of the splitter mirror.

20. A beam splitter for transmitting a portion of an input energy beam and for reflecting a portion of the input energy beam, the adjustable beam splitter having a split ratio defined by the ratio of the transmitted portion of the input energy beam to the reflected portion of the input energy beam, the beam splitter comprising:
 a splitter mirror positioned in an input path of the input energy beam for transmitting the first output energy beam through the splitter mirror along a first output path and for reflecting the second output energy beam along a second output path, the strength of the first and second beams being dependent on the angle of incidence of the input beam to the splitter mirror; and
 a movable housing for mounting the splitter mirror therein and for varying the angle of incidence of the input energy beam on the splitter mirror by varying the position of the splitter mirror with respect to the input energy beam.

21. The beam splitter of claim 20, further comprising a reflective mirror mounted within the movable housing for directing the reflected portion of the input energy beam at a fixed angle to the input energy herein regardless of the split ratio.

22. The beam splitter of claim 21, wherein the splitter mirror and the reflective mirror are rotated about a line corresponding to the intersection of a plane containing the splitter mirror and a plane containing the reflective mirror.

* * * * *